United States Patent [19]

Miyatake et al.

[11] 4,453,178
[45] Jun. 5, 1984

[54] PROJECTION TELEVISION APPARATUS

[75] Inventors: Yoshito Miyatake, Moriguchi; Yoshitomi Nagaoka, Neyagawa; Yasuo Nakajima, Hirakata, all of Japan

[73] Assignee: Matsushita Electric Industrial Co., Ltd., Osaka, Japan

[21] Appl. No.: 331,471

[22] Filed: Dec. 16, 1981

[30] Foreign Application Priority Data

Dec. 17, 1980 [JP] Japan .................. 55-179460

[51] Int. Cl.³ .............................. H04N 9/31
[52] U.S. Cl. ...................... 358/60; 358/237; 358/250
[58] Field of Search ............ 358/60, 64, 55, 231, 358/237, 238, 239, 250

[56] References Cited

U.S. PATENT DOCUMENTS 2,642,487 6/1953 Schroeder ..................... 358/64
3,328,111 6/1967 Bennett et al. ................ 358/231

Primary Examiner—Richard Murray
Attorney, Agent, or Firm—Wenderoth, Lind & Ponack

[57] ABSTRACT

A projection television apparatus having a retrofocus type projection lens system which has a sufficiently long back focus, a small F number and a large distortion. The lens system is constructed with five components and five lenses and comprises a first lens which is a negative meniscus lens that has at its screen side a convex surface, a second lens which is a biconvex lens, a third lens which is a biconcave lens, a fourth lens which is a positive lens, and a fifth lens which is a biconvex lens, and which is defined by the following four conditions, i.e.

$$1.4f < |f_1| < 1.9f \quad \text{(i)}$$

$$0.35f < d_2 < 0.55f \quad \text{(ii)}$$

$$0.8f < r_3 < 1.2f \quad \text{(iii)}$$

$$0.15f < d_4 < 0.35f \quad \text{(iv)}$$

where f is the composite focal length of the total lens system, $f_1$ is the focal length of the first lens, $d_2$ is the air space between the first lens and the second lens, $d_4$ is the air space between the second lens and the third lens, and $r_3$ is the radius of curvature of the screen side surface of the second lens.

9 Claims, 11 Drawing Figures

SPHERICAL ABERRATION

Fl. 3

-5  0  5

ASTIGMATISM

32°

S  M

-5  0  5

DISTORTION

32°

-10%  0  10%

VERTICAL SCANNING PERIOD

HORIZONTAL SCANNING PERIOD

VERTICAL SCANNING PERIOD

VERTICAL SCANNING PERIOD

PROJECTION TELEVISION APPARATUS

This present invention relates to a projection television apparatus having a retrofocus type projection lens system, and more particularly to a projection television apparatus having a retrofocus type projection lens system the F number of which is about 1.3 and the back focus of which is longer than the focal length.

In order to provide a large picture, many types of projection television apparatuses have been proposed. A projection television apparatus as shown in FIG. 1 has previously been proposed. As shown in FIG. 1, the main portion comprises an image producer 100 (three monochromatic cathode-ray tubes 1R, 1G and 1B, two dichroic mirrors 2R and 2B forming a mirror block), a lens system 3, and a screen 5. In FIG. 1, the cathode-ray tubes are placed so that two of the cathode-ray tubes share a center normal line which is crosses the center normal line of the other cathode-ray tube perpendicularly, the face-plates of the three cathode-ray tubes being the same distance from the cross point of the center normal lines, and the mirror block comprises two dichroic mirrors intersecting at the center thereof, the center point of the dichroic mirrors being at the cross point of the center normal lines of the cathode-ray tubes, and the dichroic mirrors are at a 45° angle with respect to each cathode-ray tube. The three tubes 1R, 1G and 1B display red, green and blue images, respectively. One dichroic mirror 2R is a red-type dichroic mirror which reflects red light but transmits green and blue light. The other dichroic mirror 2B is a blue-type dichroic mirror which reflects blue light but transmits red and green light. The red tube 1R and the blue tube 1B are placed on the same plane and on either side of the green tube 1G with their center normal lines forming the letter "T", with their faceplates 4R, 4G and 4B close to each other and forming three sides of a rectangular parallelepiped space. The two dichroic mirrors 2R and 2B are disposed in the space and are crossed at right angles to each other. Every angle between a normal of a dichroic mirror and an optical axis of a tube is 45°. The lens system 3 is placed on the axis of the green tube 1G and constitutes the fourth side of the rectangular parallelepiped spaced enclosing the dichroic mirrors 2R and 2B. Employing such apparatus as shown in FIG. 1, the red, green and blue images from the three tubes 1R, 1G and 1B are combined into the color image by the dichroic mirrors 2R and 2B, and the resulting color image is enlarged and projected on a screen 5 by the lens system 3.

In the apparatus as shown in FIG. 1 it is desired that the distance from the lens system 3 to the screen 5 be short so that the entire optical system can be put into a compact cabinet. In general such desire can be satisfied by using a lens system the focal length of which is short and the field angle of which is wide. But in this case one restriction is present, that the two dichroic mirrors 2R and 2B must be placed between the lens system 3 and the green tube 1G. Therefore, it is necessary for the lens system 3 to make the back focus longer as well as to make the focal length shorter. In other words, it is necessary for the lens system 3 that the back focus ratio (the ratio of the back focus to the focal length) be larger.

In order to enlarge the back focus ratio, a retrofocus type lens system is favorable. The retrofocus type lens system is familiar for use in single-lens reflex cameras, but there is no example of a retrofocus type lens system for use in projection television apparatuses. Lens systems for single-lens reflex cameras cannot be used as lens systems for use in projection television apparatuses, because the required characteristics are quite different for the two uses. Inferior resolution is allowable for the lens systems used in projection television apparatuses if the scanning lines appearing on the screen 5 are apart and clear from each other. On the contrary, the F number must be small to use light from tubes 1R, 1G and 1B efficiently.

And also it is desirable to achieved the function of the lens with as few components as possible, with as small glass volume as possible, and with as cheap glasses as possible, because lens systems for projection television apparatuses are apt to be expensive due to the necessity for large lens components.

It is an object of the present invention to provide a projection television system having a retrofocus type projection lens system the back focus of which is longer than its focal length.

It is another object of the present invention to provide a projection television system having a retrofocus type projection lens system that has a simple construction and is able to be manufactured at lower cost than previous lens systems. It is a further object of the present invention to provide a projection television system having a retrofocus type projection lens system which projects a picture image from cathode-ray tubes with little color shading.

A retrofocus type projection lens system used for a projection television apparatus according to the present invention is constituted by five components and five lenses and comprises, in sequence moving from the screen side, a first lens which is a negative meniscus lens that has at its screen side a convex surface, a second lens which is a biconvex lens, a third lens which is a biconcave lens, a fourth lens which is a positive lens, and a fifth lens which is a biconvex lens.

Other objects, features and advantages of the present invention will appear more fully from the following description.

For a better understanding of the present invention, the same will be explained by reference to the accompanying drawings in which.

A projection television apparatus according to the present invention is formed from unique thinking as to distortion. This thinking is described below. In the following description, rays of light are described as proceeding in an opposite direction to the direction of the real rays, i.e. the rays of light are described as proceeding from the screen to the tubes.

In trying to provide a lens system the back focus of which is longer than the focal length thereof and the F number of which is about 1.3 by using a simple type lens system such as five components and five lenses, it is difficult to correct various aberrations with better balance. It is difficult, more especially, in a retrofocus type lens system to correct negative distortion and chromatic aberration of magnification because of its asymmetrical constitution. So in the present invention, negative distortion, the correction of which is difficult, is permitted, but an attempt to correct other aberrations is made. An attempt is made to correct the residual distortion of the lens system by distorting the pictures being projected by the tubes in the opposite direction, i.e. in the distortion correction direction.

Figure 1:
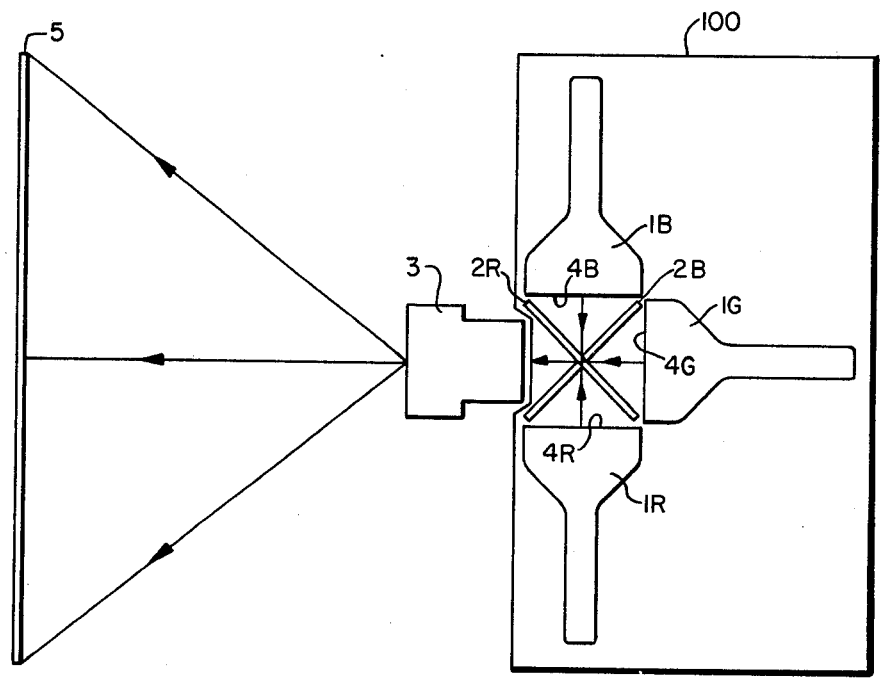
FIG. 1 is a diagrammatic cross-sectional view of a main portion of a projection television apparatus in which a projection lens system can be used according to the present invention.

Introducing negative distortion into a lens system provides two more advantages in the projection television apparatus shown in FIG. 1. First, brightness on the screen is improved due for the reason described below. It is desirable for a projection television apparatus to make the picture image rectangular without rounding off at the four corners. In order to project a rectangular picture image on the screen which is placed perpendicular to the optical axis of the lens system, the rectangular picture image must be displayed on a cathode-ray tube, if a lens system doesn't have any distortion. Since the tube has rounded off portion at the four corners of its faceplate in general, when the rectangular picture image is displayed on the tube spread to maximum size, ineffective areas occur at the top and bottom and at the right and left. By causing the tube to display a negative distorted image (i.e. the image has a barrel type distortion), the lens is caused to cancel the distortion caused by the tube, so that a rectangular image is displayed on the screen without distortion. Displaying an image on the tube with negative distortion and spreading it to a maximum size, an area of the image on the tube can be made larger. As a result, the image on the screen can be made brighter, where the input power per unit area is the same as for prior art systems. In general a retrofocus type lens system tends to cause distortion which is negative in the convergent component side. Thus by introducing a retrofocus type lens system with negative distortion into the projection television apparatus, the phosphorescent surface of the tube can be used effectively.

The second advantage is described below. The projection television apparatus as shown in FIG. 1 has a disadvantage as follows. When the tubes 1R, 1G and 1B are driven to display uniform-brightness images, the phenomenon that the color is dependent on the location in a horizontal or vertical direction on the screen is observed (this is so-called color shading). This phenomenon is caused by the characteristics of dichroic mirrors that the cutoff wavelength is dependent on the angle of incidence. As the angle of incidence increases, the cutoff wavelength becomes shorter. The extreme of this phenomenon is observed when using a lens with a small F number and when using a wide angle lens. If the field angle of the screen side is made larger and the field angle of the tube side is made smaller, it is possible to reduce the color-shading phenomenon, because the ranges of the angle of incidence on the dichroic mirrors become smaller.

In general a retrofocus type lens system tends to cause negative distortion because of the following reason. Because the more peripheral portion of a lens has a larger refractive effect, when the field angle of the ray of light entering into the divergent component becomes large, the field angle of the ray of light from the divergent component doesn't become proportionally as large. And also, when the field angle of the ray of light entering into the convergent component becomes larger, the field angle of the ray of light exiting from the convergent component doesn't become proportionally as large. Conversely speaking, if the field angle on the screen side becomes large and the field angle on the tube side becomes small, the negative distortion tends to occur. Additionally, as the difference between the two field angles becomes large, the negative distortion becomes large. Therefore, by introducing large negative distortion into the projection lens system which is used for the projection television apparatus shown in FIG. 1, the field angle on the tube side can be made small and as a result the color shading phenomenon can be reduced.

In order to obtain the two effects described above, the condition given by $$-20\% < D < -5\%$$

should be satisfied, where $D[\%]$ is the distortion on the tube side at the maximum field angle. If $D < -20\%$, it is difficult to compensate this distortion with the deflection circuits of the cathode-ray tube. If $D > -5\%$, sufficient effect in the increase of brightness and the improvement of color-shading phenomenon is not obtained.

Figure 2:
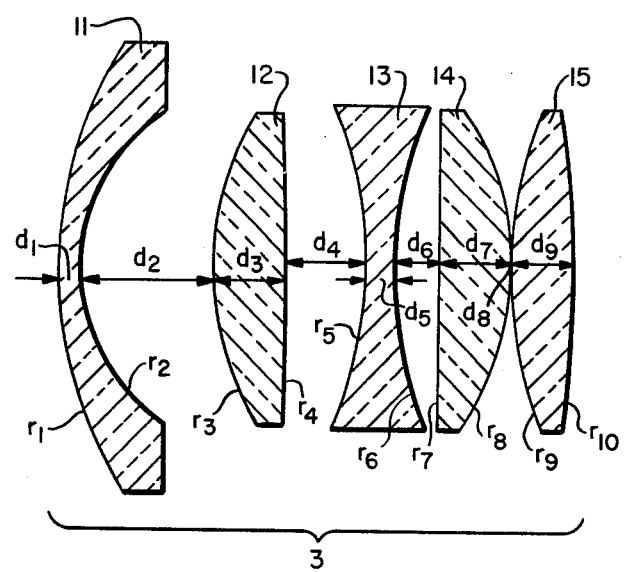
FIG. 2 is a cross-sectional view of a projection lens system for a projection television apparatus according to the present invention.

Referring to FIG. 2, a projection lens system according to the present invention is constructed with five components and five lenses and comprises, in sequence from the screen side, a first lens 11 which is a negative meniscus lens that has at its screen side a convex surface, a second lens 12 which is a biconvex lens, a third lens 13 which is a biconcave lens, a fourth lens 14 which is a positive lens, and a fifth lens 15 which is a biconvex lens.

A projection lens system of FIG. 2 satisfies the following four conditions:

$$1.4f < |f_1| < 1.9f \quad \text{(i)}$$

$$0.35f < d_2 < 0.55f \quad \text{(ii)}$$

$$0.8f < r_3 < 1.2f \quad \text{(iii)}$$

$$0.15f < d_4 < 0.35f \quad \text{(iv)}$$

where f is the composite focal length of the total lens system, $f_1$ is the focal length of the first lens, $d_2$ is the air space between the first lens and the second lens, $d_4$ is the air space between the second lens and the third lens, and $r_3$ is the radius of curvature of the screen side surface of the second lens.

The significances of the foregoing conditions will now be described. The condition (i) is the condition for obtaining the required back focus while keeping a balance of various aberrations of the total lens system, by limiting the $f_1$ that is the focal length of the first lens 11. If $|f_1|$ is smaller than 1.4f, the required back focus can be obtained. But it is impossible to sufficiently correct the aberrations which occur in the first lens 11 with the aid of other lenses. If $|f_1|$ is larger than 1.9f, it becomes difficult to obtain the required back focus. And it becomes undesirable in its cost, because the positive lenses must be made of higher refractive index glass, which is expensive in general, in order to decrease the Petzval's sum of the total lens system.

The condition (ii), associated with the condition (i), is the condition for the purpose of obtaining the required back focus as well as preventing the decrease of the peripheral light volume. If $d_2$ is smaller than 0.35f, it becomes impossible to obtain the required back focus. If $d_2$ is larger than 0.55f, it is advantageous in lengthening the back focus, but the peripheral light volume decreases, because the total length of the lens system becomes long. It is impossible to increase the diameter of the first lens 11 in order to increase the peripheral light volume, but this means is undesirable because of its cost, because the first lens 11 becomes exceedingly large.

The condition (iii) is the condition for the purpose of making it easy to correct the large chromatic aberration of magnification, which is caused by the first lens 11, with the aid of other lenses. The second lens 12 is a biconvex lens in order to reduce the spherical aberration. Also, the screen side surface of the second lens 12 has an optimum curvature so that rays at a large field angle enter it at as small an incidence angle as possible, in order to reduce a newly occurring chromatic aberration of magnification. If $r_3$ is larger than 1.2f, the effect described above diminishes and as a result it becomes difficult to correct the chromatic aberration of magnification. If $r_3$ is smaller than 0.8f, it becomes difficult to sufficiently correct the spherical aberration.

The condition (iv) is the condition for the purpose of correcting effectively the coma which is caused by the first lens 11. If $d_4$ is smaller than 0.15f, it is impossible to sufficiently correct both the coma and the chromatic aberration of magnification. If $d_4$ is larger than 0.35f, the total length of the lens system becomes long and hence the difference in light volume between the center field and the peripheral field becomes exceedingly large.

As stated hereinbefore, the present invention, by adopting suitable types of successive components and the refractive power distribution and suitable thickness of lenses as defined by the above described four conditions, provides a projection lens system which can significantly correct the various aberrations and in which the aperture ratio is F1.3, and the field angle is 60°. The lens system according to the present invention has advantageous features in the improvement of the brightness of the image on the screen and in the diminution of the color shading phenomenon, the simple construction of five components and five lenses, and the use of low refractive index glasses which are cheap in general.

Numerical data for the examples of the present invention will be shown below. In the tables below, R represents the radius of curvature, d the inter-vertex distance, n the refractive index, and $\nu$ the Abbe's number. Although the arrangement of Example 1 has been shown in FIG. 2, that of Example 2 is omitted because it is similar to the arrangement of FIG. 1. The faceplate glass itself causes aberrations, but these aberrations are negligible compared with those of the lens system.

Example 1

| Focal length f = 100, Field angle 64°, F1.3, Back focus 117 | | | |
|---|---|---|---|
| $R_1 = 132.0$ | | | |
| | $d_1 = 7.76$ | $n_1 = 1.589$ | $\nu_1 = 61.0$ |
| $R_2 = 57.8$ | | | |
| | $d_2 = 44.7$ | | |
| $R_3 = 97.8$ | | | |
| | $d_3 = 23.4$ | $n_2 = 1.670$ | $\nu_2 = 47.4$ |
| $R_4 = -604.4$ | | | |
| | $d_4 = 25.8$ | | |
| $R_5 = -141.9$ | | | |
| | $d_5 = 8.5$ | $n_3 = 1.648$ | $\nu_3 = 33.6$ |
| $R_6 = 117.5$ | | | |
| | $d_6 = 14.2$ | | |
| $R_7 = 3060$ | | | |
| | $d_7 = 24.9$ | $n_4 = 1.589$ | $\nu_4 = 61.0$ |
| $R_8 = -83.6$ | | | |
| | $d_8 = 0.09$ | | |
| $R_9 = 143.1$ | | | |
| | $d_9 = 20.4$ | $n_5 = 1.589$ | $\nu_5 = 61.0$ |
| $R_{10} = -313.8$ | | | |

Figure 3A:
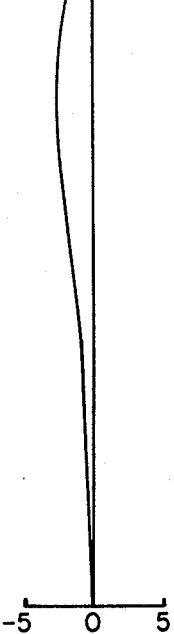
FIGS. 3a, 3b and 3c are aberration characteristic curves of the embodiment shown in FIG. 2.
Figure 3B:
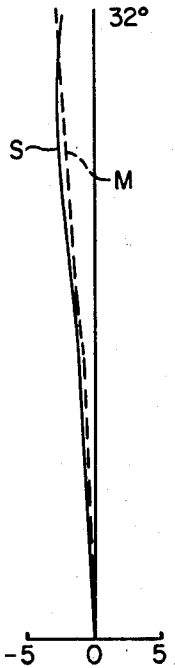
Figure 3C:
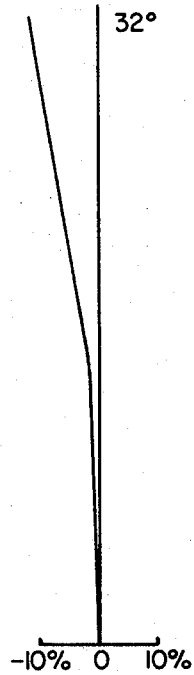

In FIGS. 3a, 3b and 3c are shown various aberration characteristic curves of the present embodiment. FIG. 3a shows the spherical aberration, FIG. 3b the astigmatism, and FIG. 3c the destortion.

Example 2

| Focal length f = 100, Field angle 64°, F1.3, Back focus 117 | | | |
|---|---|---|---|
| $R_1 = 133.7$ | | | |
| | $d_1 = 7.78$ | $n_1 = 1.589$ | $\nu_1 = 61.0$ |
| $R_2 = 58.3$ | | | |
| | $d_2 = 44.9$ | | |
| $R_3 = 96.5$ | | | |
| | $d_3 = 23.7$ | $n_2 = 1.670$ | $\nu_2 = 47.4$ |
| $R_4 = -665.8$ | | | |
| | $d_4 = 25.9$ | | |
| $R_5 = -142.3$ | | | |
| | $d_5 = 8.6$ | $n_3 = 1.648$ | $\nu_3 = 33.6$ |
| $R_6 = 115.7$ | | | |
| | $d_6 = 14.2$ | | |
| $R_7 = 3484$ | | | |
| | $d_7 = 25.0$ | $n_4 = 1.589$ | $\nu_4 = 61.0$ |
| $R_8 = -83.6$ | | | |
| | $d_8 = 0.09$ | | |
| $R_9 = 141.8$ | | | |
| | $d_9 = 20.8$ | $n_5 = 1.589$ | $\nu_5 = 61.0$ |
| $R_{10} = -316.0$ | | | |

Figure 4:
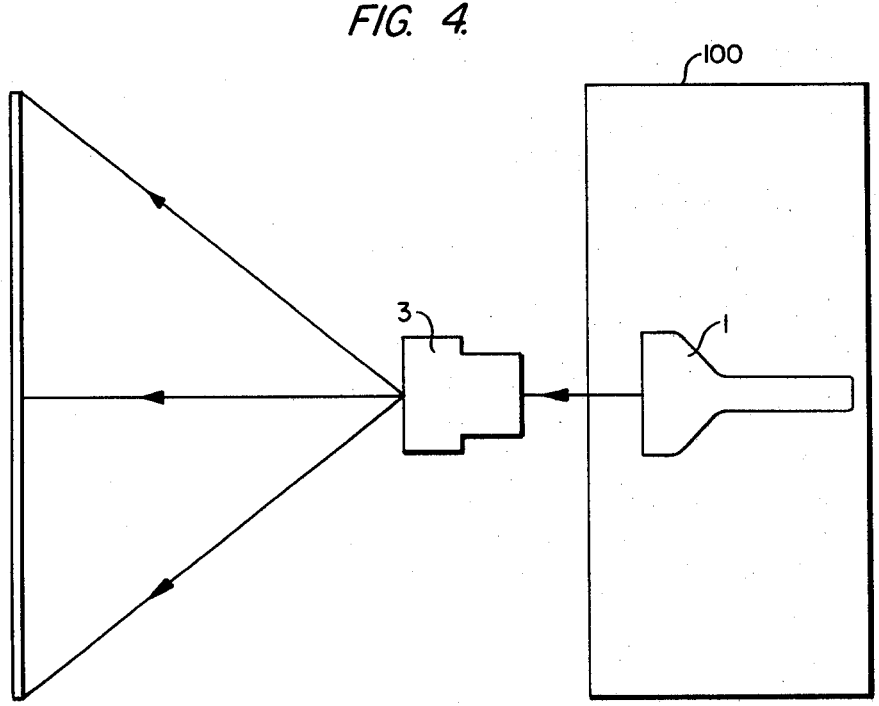
FIG. 4 is another embodiment of a projection television apparatus according to the present invention.

FIG. 4 shows another embodiment of the projecting television apparatus according to the present invention. The image producer 100 comprises one black and white cathode-ray tube 1. Accordingly, no mirror is necessary.

Figure 5:
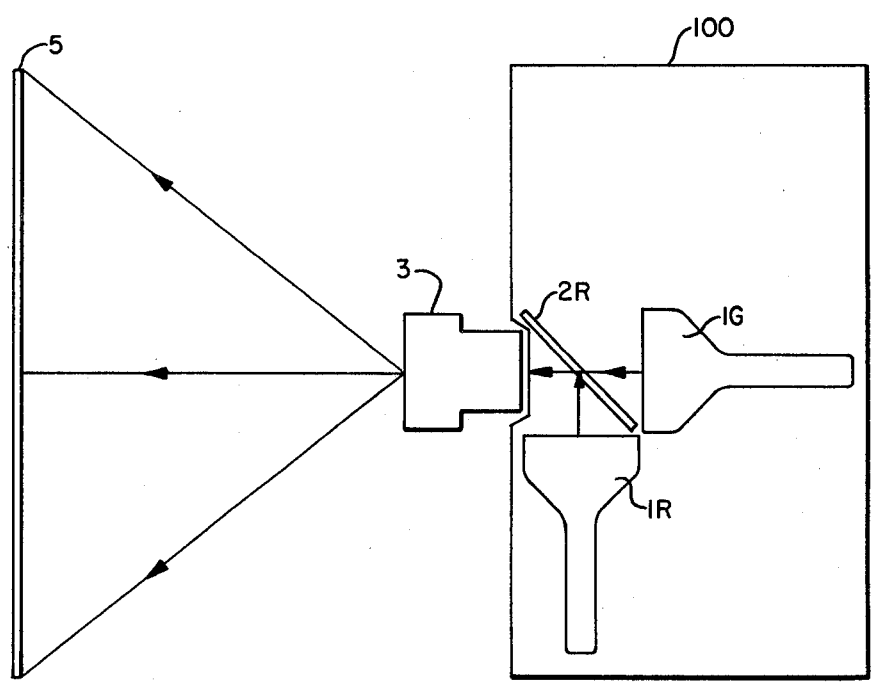
FIG. 5 is a further embodiment of a projection television apparatus according to the present invention.

FIG. 5 shows a further embodiment of the projecting television apparatus according to the present invention. The image producer 100 comprises two monochromatic cathode-ray tubes 1G and 1R (other combinations such as 1G, 1B and 1B, 1R are also possible) and one dichroic mirror 2R as the mirror block. This configuration may be used as a simple graphic display apparatus.

The method of correcting the distortion caused by the lens system will be described bellow. In general, a cathode-ray tube displays a picture having a distortion like a pincushion. This pincushion distortion becomes large as the deflection angle increases. There is a cathode-ray tube, the deflection angle of which is very large for example 110°, for use in direct-view type television receivers, and such a cathode-ray tube displays a greatly distorted picture. This distortion may be corrected by deforming the magnetic field, for example, by placing magnets near the deflection yoke or changing the manner of winding wires in the deflection yoke. And also the distortion may be corrected by deforming the current waveforms which flow in the vertical deflection coil and the horizontal deflection coil. The above methods are well known previously, and the last described method is generally used because of its ease of use.

A cathode-ray tube for use in a projection television apparatus has a smaller deflection angle, for example 50° or 70°, for the following reasons:

In projecting the picture image of the cathode-ray tube without pincushion correction onto the screen by the lens systems according to the present invention, the projected image has a pincushion distortion which is almost the same amount as the cathode-ray tube the deflection angle of which is 110°, for use in direct-view television receivers. Therefore, using the correction method applied to such a cathode-ray tube the deflection angle of which is 110°, the distortion of the lens system according to the present invention can be corrected and the projection television apparatus according to the present invention can provide a picture image on the screen which is corrected for distortion.

The concrete steps of using circuit technology will be described below.

Figure 6A:
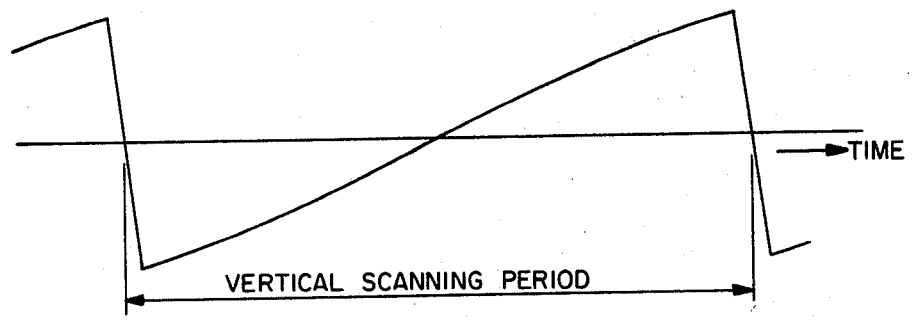
FIGS. 6a, 6b, 6c and 6d are waveforms of the deflection current for correcting the distortion caused by the lens system according to the present invention.
Figure 6B:
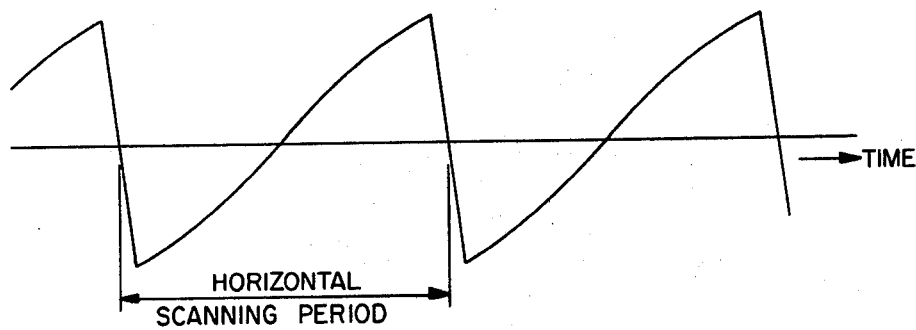
Figure 6C:
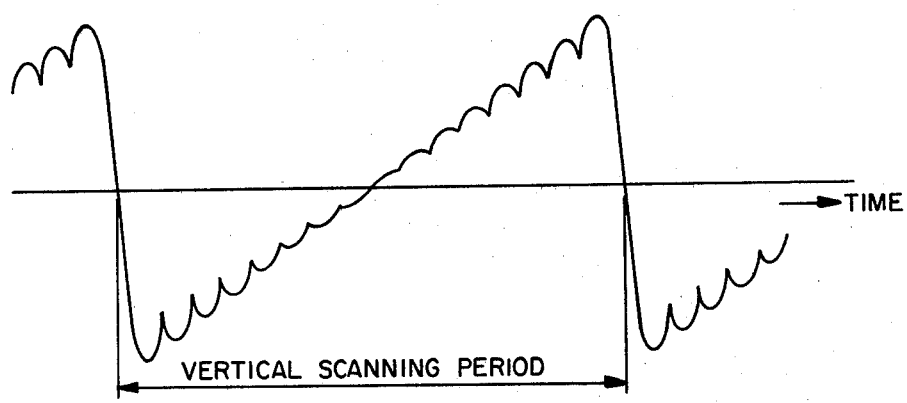
Figure 6D:
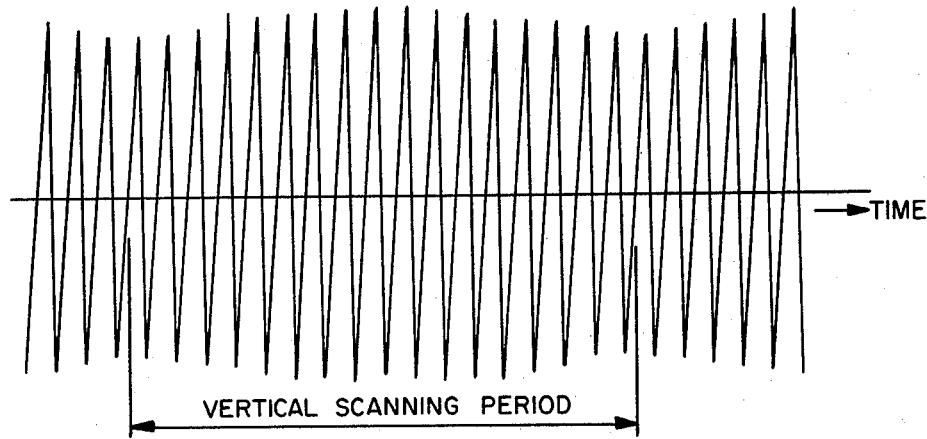

The scanning linearities of the vertical and horizontal deflection are improved by deforming the sawtooth waveforms of both the vertical and the horizontal deflection currents so as to have a shape like the letter "S" as shown in FIGS. 6a and 6b respectively. The top and bottom pincushion is corrected by deforming the vertical deflection current into the waveform as shown in FIG. 6c which is given by superposing on the sawtooth waveform of the vertical deflection current shown in FIG. 6a a parabolic waveform the period of which equals that of the horizontal deflection current and the size of which is proportional to the amplitude of the vertical deflection current. The side pincushion is corrected by deforming the horizontal deflection current into the waveform as shown in FIG. 6d which is obtained by changing the amplitude of the horizontal deflection current shown in FIG. 6b so that the envelope has a parabolic waveform the period of which equals that of the vertical deflection. If the amount of the distortion caused by the lens system is large, increasing the amount of the distortion correction will provide a picture image which has no distortion.

In order to make the distortion correction easier, it is necessary for the lens system that the characteristic curve of the distortion has no inflection point in the whole effective field angle.

It will thus be appreciated that the present invention can provide a projection television apparatus having a retrofocus type projection lens system the back focus of which is longer than the total focal length.

What is claimed is:

1. A projection television apparatus comprising:
   an image producing means for producing a picture image which is to be projected;
   a screen; and
   a retrofocus lens means between said image producing means and said screen for enlarging said image from said image producing means and projecting the enlarged image on said screen.

2. A projection television apparatus according to claim 1, wherein said image producing means comprises a cathode-ray tube for displaying said picture image thereon.

3. A projection television apparatus according to claim 1, wherein said image producing means comprises: two monochromatic cathode-ray tubes for displaying thereon color images, respectively; and a mirror block positioned for receiving said color images from said cathode-ray tubes and combining them into said picture image and directing said image into said retrofocus lens means, said retrofocus lens means having a back focus longer than said mirror block.

4. A projection television apparatus according to claim 1, wherein said image producing means comprises: three monochromatic cathode-ray tubes for displaying thereon red, green and blue color images, respectively; a mirror block positioned for receiving said color images from said cathode-ray tubes and combining them into said picture image and directing said image into said retrofocus lens means, said retrofocus lens means having a back focus longer than said mirror block.

5. A projection television apparatus according to claim 4, wherein said cathode-ray tubes are placed so that two of the cathode-ray tubes share a center normal line which intersects the center normal line of the other cathode-ray tube at right angles, the face-plates of the three cathode-ray tubes being the same distance from the intersection of the center normal lines, and said mirror block comprises two dichroic mirrors intersecting at the center thereof, the center-point of said dichroic mirrors being at the intersection of the center normal lines of the cathode-ray tubes, and the dichroic mirrors being at a 45° angle with respect to each cathode-ray tube.

6. A projection television apparatus according to claim 1 or 2 or 3 or 4 or 5, wherein the distortion on the tube side of said retrofocus lens means at the maximum field angle is from −5% to −20%.

7. A projection television apparatus according to claim 6, wherein the characteristic curve of said distortion has no inflection point.

8. A projection television apparatus according to claim 1, wherein said retrofocus lens means comprises five components and five lenses composed of, from the screen side, a first lens which is a negative meniscus lens the screen side of which is a convex surface, a second lens which is a biconvex lens, a third lens which is a biconcave lens, a fourth lens which is a positive lens, and a fifth lens which is a biconvex lens.

9. A projection television apparatus according to claim 8, wherein said retrofocus lens means satisfies the following conditions:

$$1.4f < |f_1| < 1.9f \quad \text{(i)}$$

$$0.35f < d_2 < 0.55f \quad \text{(ii)}$$

$$0.8f < r_3 < 1.2f \quad \text{(iii)}$$

$$0.15f < d_4 < 0.35f \quad \text{(iv)}$$

where f is the composite focal length of the lens system, $f_1$ is the local length of said first lens, $d_2$ is the air space between said first lens and said second lens, $d_4$ is the air gap between said second lens and said third lens, and $r_3$ is the radius of curvature of the screen side surface of said second lens.

* * * * *